(12) United States Patent
Chen et al.

(10) Patent No.: US 7,715,704 B2
(45) Date of Patent: May 11, 2010

(54) AUTO-FOCUSING CAMERA

(75) Inventors: Ying-Sen Chen, Taipei Hsien (TW); Ching-Hsing Huang, Taipei Hsien (TW); Jen-Te Wang, Taipei Hsien (TW); Huai-Chao You, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 144 days.

(21) Appl. No.: 12/013,926

(22) Filed: Jan. 14, 2008

(65) Prior Publication Data
US 2009/0097837 A1   Apr. 16, 2009

(30) Foreign Application Priority Data
Oct. 10, 2007   (CN)   ............. 2007 1 0123805.5

(51) Int. Cl.
G03B 3/10   (2006.01)
G02B 7/02   (2006.01)
(52) U.S. Cl. .................................. 396/133; 359/824
(58) Field of Classification Search ............... 396/73, 396/74, 79, 83, 85, 529, 72, 133; 359/822–824; 310/311
See application file for complete search history.

(56) References Cited

U.S. PATENT DOCUMENTS

| 7,039,309 | B2 | 5/2006 | Hsiao | |
| 7,443,618 | B2 | 10/2008 | Hsiao et al. | |
| 2006/0062559 | A1* | 3/2006 | Naka et al. | 396/79 |
| 2008/0285162 | A1* | 11/2008 | Fujita et al. | 359/823 |
| 2008/0310831 | A1* | 12/2008 | Huang et al. | 396/133 |

FOREIGN PATENT DOCUMENTS

| CN | 1910491 A | 2/2007 |
| CN | 1924686 A | 3/2007 |

* cited by examiner

*Primary Examiner*—W. B. Perkey
*Assistant Examiner*—Minh Q Phan
(74) *Attorney, Agent, or Firm*—Frank R. Niranjan

(57) ABSTRACT

An auto-focusing camera includes a lens mount (10), a lens unit (31) and a motor. The lens unit includes a lens barrel (310) and a lens (312) received in the lens barrel. Tabs (34) and blocks (36) respectively extend outwardly from upper and lower end portions of the lens barrel. Each of the tabs forms an aslant guiding surface (342), which is declined outwardly along a top-to-bottom direction. The motor includes a magnet (32) which is forced to move over the guiding surfaces to be securely sandwiched between the tabs and the blocks. Upper and lower yokes (23a, 23b) are respectively arranged at the upper and lower sides of the magnet. Upper and lower coils (25a, 25b) respectively wind around the two yokes for establishing magnetic fields which interact with the magnetic field of the permanent magnet to drive the lens unit into movement.

11 Claims, 6 Drawing Sheets

AUTO-FOCUSING CAMERA

BACKGROUND OF THE INVENTION

1. Field of the Invention

The present invention relates generally to a camera, and more particularly to a lens unit of an auto-focusing camera.

2. Description of Related Art

Over the years cameras have evolved toward lightweight and compactness; however, conventionally an auto focus structure is used for controlling the telescopic movement of a lens of the camera and the auto focus structure occupies a significant space in the camera.

The auto-focus structure of the camera focuses on an object by comparing the obtained image with the image on an image sensor. The image sensor is either a charge coupled device (CCD) sensor or a complementary metal oxide semiconductor (CMOS) sensor, and is controlled by a central processing unit (CPU) installed inside the digital camera. The lens moves back and forth around its original positions (static positions). As the lens moves, the CPU compares the image from the lens with the image in the image sensor. As the lens moves to the position where the image is the clearest, then the lens stops at the position. In this case, the lens has to be continuously driven back and forth by a motor structure. Generally the motor structure is column-shaped, including coils wound therearound and a permanent magnet being mounted around the lens. During operation of the motor, a current is applied to the coils to establish an alternating magnetic field. The magnetic field of the permanent magnet interacts with the alternating magnetic field of the coils to drive the lens to move. At the moment when the CPU detects a focused image as the lens moves back and forth, a stop signal is simultaneously sent to the motor. Therefore, the lens stops at the best focal position (static position).

To firmly secure the permanent magnet around the lens, glue is usually used. However, the glue needs a long period of time to be cured before the lens/permanent magnet combination can be assembled with other components. The long period of time needed for the glue to cure causes the manufacturing of the auto-focus lens to have a high cost and low efficiency. Such a shortcoming needs to be solved.

SUMMARY OF THE INVENTION

According to a preferred embodiment of the present invention, an auto-focusing camera includes a lens mount, a lens unit received in the lens mount and a motor. The lens unit includes a lens barrel and a lens received in the lens barrel. At least one tab and at least one block respectively extend outwardly from two opposite end portions of the lens barrel. The at least one tab forms an aslant guiding surface, which is slantwise outwardly towards the at least one block. The motor includes a magnet which is forced to move over the guiding surface of the at least one tab to reach a middle of the lens barrel. At the middle of the lens barrel, the magnet is fixedly sandwiched between the at least one tab and the at least one block to limit movement of the magnet along an axial direction of the lens barrel. Upper and lower yokes are respectively arranged at the two opposite sides of the magnet. Upper and lower coils respectively wind around the two yokes for establishing magnetic fields which interact with the magnetic field of the permanent magnet to drive the lens unit into movement when electric currents are applied to the coils.

Other advantages and novel features of the present invention will be drawn from the following detailed description of a preferred embodiment of the present invention with attached drawings, in which:

BRIEF DESCRIPTION OF THE DRAWINGS

Many aspects of the present auto-focusing camera can be better understood with reference to the following drawings. The components in the drawings are not necessarily drawn to scale, the emphasis instead being placed upon clearly illustrating the principles of the present auto-focusing camera. Moreover, in the drawings, like reference numerals designate corresponding parts throughout the several views:

FIG. 6 is a cross-sectional view of the lens barrel of FIG. 5 taken along line VI-VI thereof, wherein FIG. 6 is turned downwards 90 degrees from FIG. 5.

DETAILED DESCRIPTION OF THE INVENTION

Figure 1:
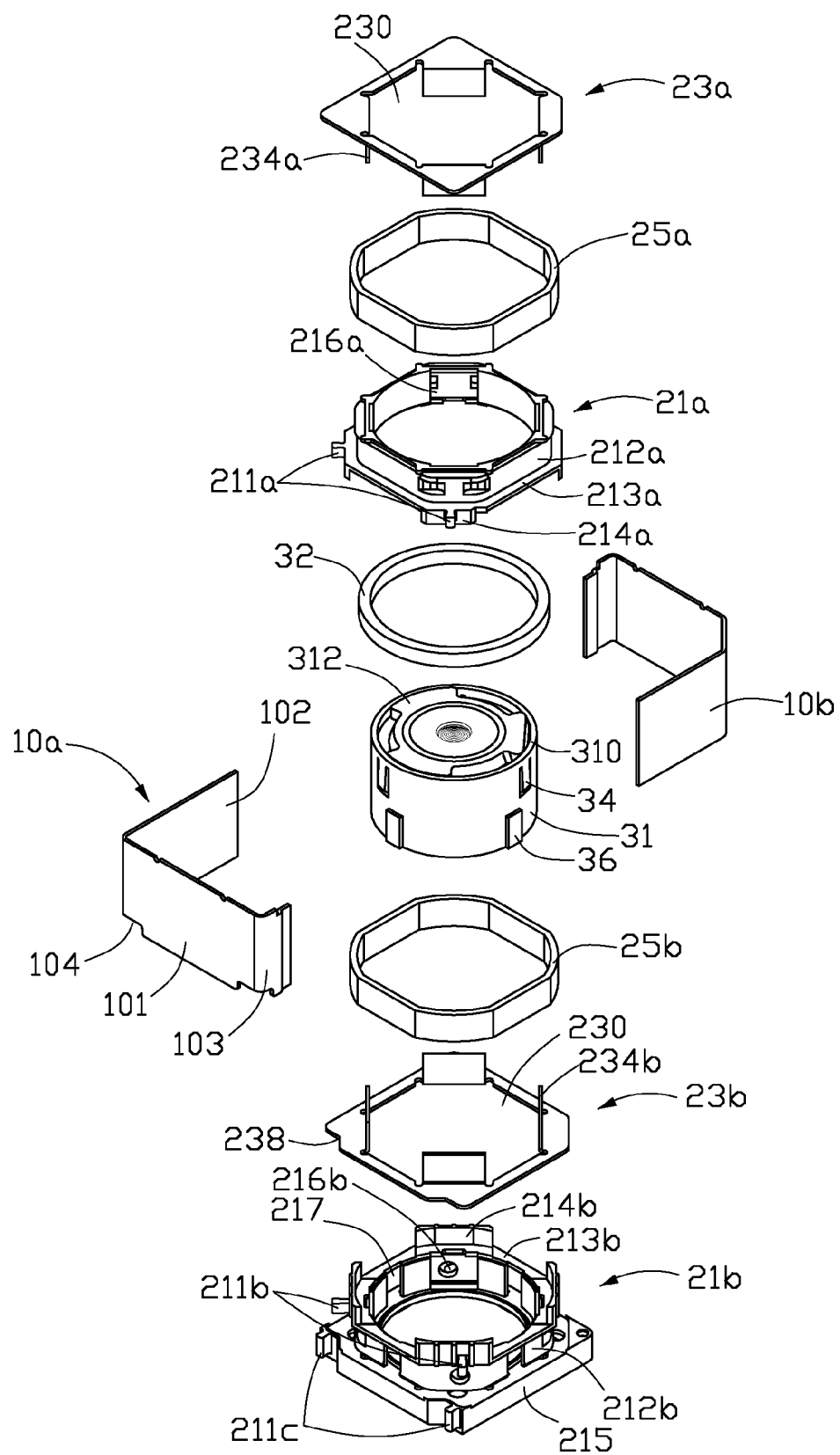
FIG. 1 is an isometric, exploded view of an auto-focusing camera in accordance with a preferred embodiment of the present invention.
Figure 2:
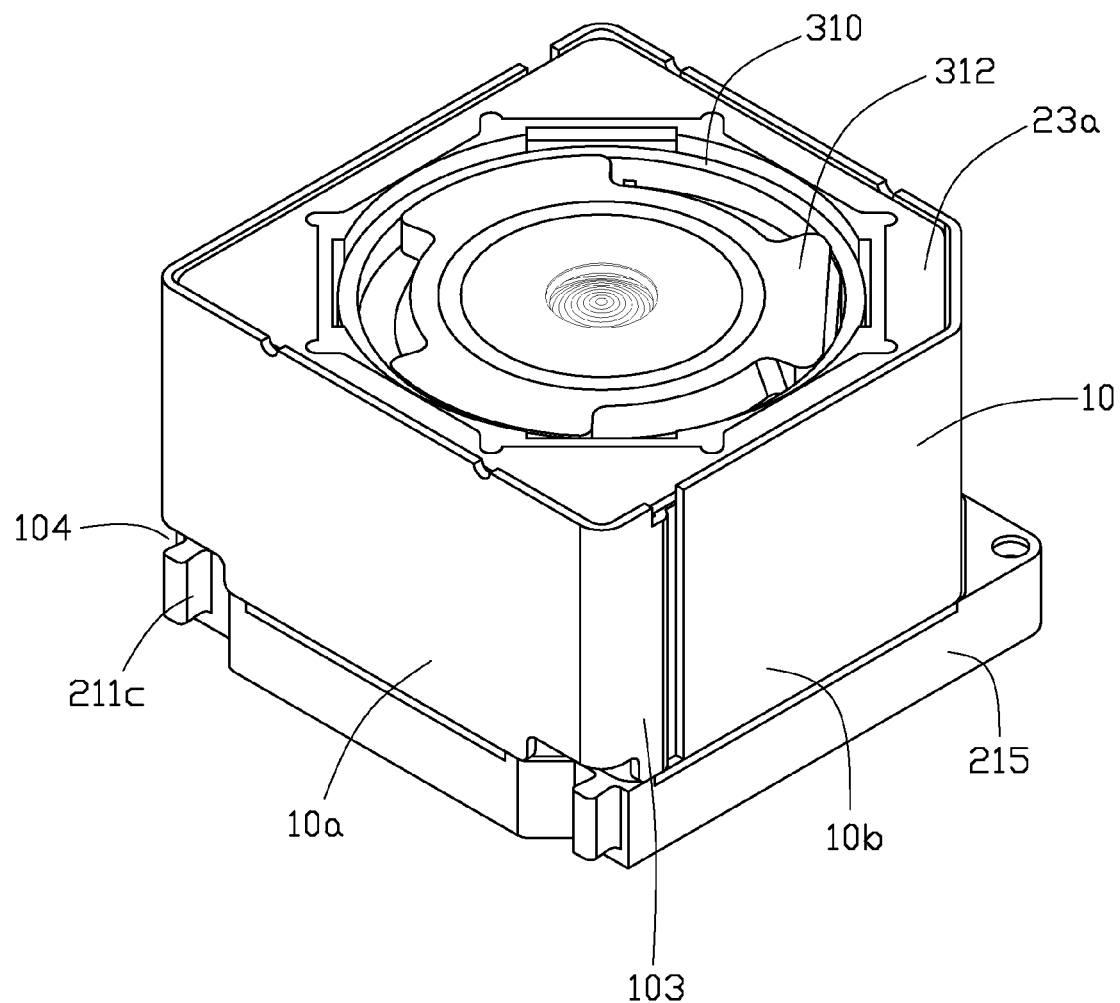
FIG. 2 is an assembled view of the auto-focusing camera of FIG. 1.

Referring to FIGS. 1-2, an auto-focusing camera according to a preferred embodiment includes a lens mount 10, a lens unit 31 received in the lens mount 10, and a motor (not labeled) mounted around the lens unit 31. During operation, the motor drives the lens unit 31 into a telescopic movement between its focal points.

The lens mount 10 is a hollow, regular prism with top and bottom ends thereof being open; a space (not labeled) is thus defined in the lens mount 10 receiving the lens unit 31 and the motor therein. The lens mount 10 is constructed by fixedly connecting two L-shaped parts 10a, 10b together. Each part 10a, 10b includes first and second plates 101, 102 perpendicular to each other, and a narrow lateral 103 extending perpendicularly from the first plate 101. The lateral 103 of each part 10a, 10b overlaps the second plate 102 of the other part 10b, 10a and is fixedly connected therewith by laser soldering. Alternatively, the two parts 10a, 10b of the lens mount 10 can lock with each other to assemble together; for example, one of the two parts 10a, 10b defines an aperture therein, and the other part 10a, 10b form a protrusion engaging into the aperture. Also locking devices, such as screws or rivets can be used to lock the two parts 10a, 10b together to form the lens mount 10. A cutout 104 is defined in each of two neighboring corners of a bottom end of the part 10a of the lens mount 10.

Figure 3:
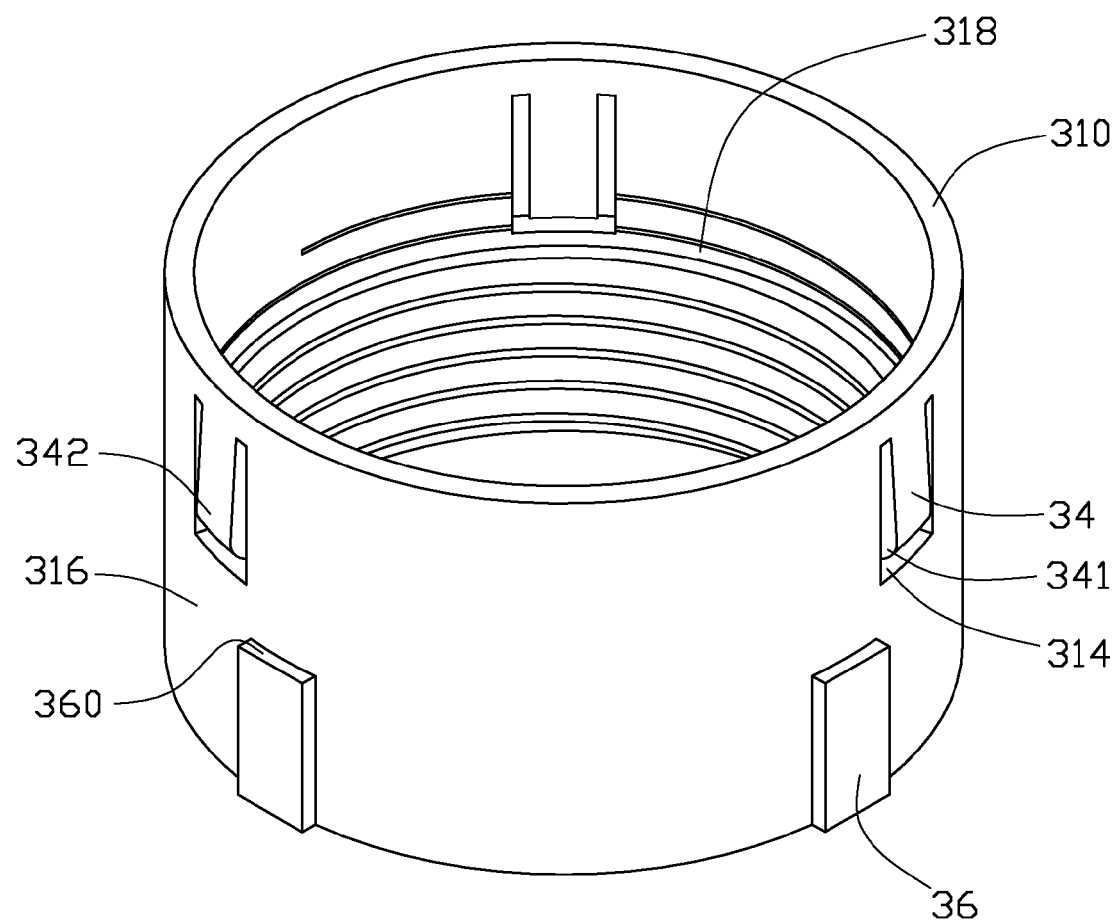
FIG. 3 is an enlarged, isometric view of a lens barrel of the auto-focusing camera of FIG. 1.

Referring to FIG. 3, the lens unit 31 includes a cylindrical lens barrel 310, and a lens 312 being fixedly mounted in the lens barrel 310. The lens barrel 310 forms an inner thread 318 on an inner surface thereof, and the lens 312 forms an outer thread (not shown) on an outer surface thereof, which threadedly engages with the inner thread 318 of the lens barrel 310. Thus the lens 312 can be easily and precisely assembled in a required initial position by adjusting relative position of the lens 312 relative to the lens barrel 310 when the lens 312 is screwed in the lens barrel 310 to form the lens unit 31. The lens barrel 310 has three blocks 36 extending outwardly from a lower portion thereof and three tabs 34 extending outwardly from an upper portion thereof. The blocks 36 are evenly spaced from each other along a circumferential direction of the lens barrel 310. Each block 36 has a constant thickness. A planar supporting surface 360 is formed at a top side of each block 36.

The tabs 34 are evenly spaced from each other along the circumferential direction of the lens barrel 310. The tabs 34 are spaced from the blocks 36 a distance along an axial direction of the lens barrel 310. Each tab 34 is wedge-shaped. A thickness of each tab 34 gradually increases along the axial direction of the lens barrel 310 from the upper portion to the lower portion thereof. Each tab 34 has a top side connected to the lens barrel 310, and three other sides (i.e., the bottom, the left and right sides) spaced from the lens barrel 310. Each of the two corners of the bottom side of each tab 34 forms a chamfer angle 341. A narrow gap 314 is defined between the three sides of each tab 34 and the lens barrel 310, and thus the tabs 34 can move relative to the lens barrel 310 when a force applied on the tabs 34. In a free state, an inner surface of each tab 34 is coplanar with the inner surface of the lens barrel 310, and an outer surface of each tab 34 forms an aslant and arc-shaped guiding surface 342 which protrudes outwardly gradually along a top-to-bottom direction.

The motor includes a permanent magnet 32 mounted around the lens barrel 310, upper and lower yokes 23a, 23b arranged at upper and lower sides of the magnet 32, and upper and lower coil seats 21a, 21b with upper and lower coils 25a, 25b winding therearound and connected to the upper and lower yokes 23a, 23b, respectively. The magnet 32 has a cylindrical shape, and is arranged between the tabs 34 and the blocks 36 of the lens barrel 310. An inner diameter of the magnet 32 is approximately the same as an outer diameter of the lens barrel 310, and a height of the magnet 32 is approximately the same as a distance between the bottom sides of the tabs 34 and the top sides of the blocks 36. When assembled, the magnet 32 is brought to move downwardly from the top end of the lens barrel 310. Each tab 34 of the lens barrel 310 rotates inwardly around its top side by the force the magnet 32 exerting thereon. Thus, the guiding surfaces 342 of the tabs 34 are forced to move inwardly along a radial direction of the lens barrel 310, and the magnet 32 can move downwardly easily. When the magnet 32 moves to the position of the blocks 36 arranged at the lower portion of the lens barrel 310, the blocks 36 of the lens barrel 310 prevent the magnet 32 from continuously moving downwards and the supporting surfaces 360 of the blocks 36 support the magnet 32 thereon. The tabs 34 then resume their free state, and the bottom sides of the tabs 34 are protruded outward of the lens barrel 310 and abut against the top of the magnet 32. The tabs 34 and the blocks 36 are thus located at two opposite sides of the magnet 32 to limit movement of the magnet 32 along the axial direction. The magnet 32 is thus fixedly assembled to the lens unit 31.

The coil seats 21a, 21b are approximately identical to each other. Each of the coil seats 21a, 21b includes a cylinder 212a, 212b and a flange 213a, 213b extending radially and outwardly from the cylinder 212a, 212b near the permanent magnet 32. The flanges 213a, 213b are octagon-shaped, and four ears 214a, 214b extend perpendicularly from four spaced sides of an outer periphery of each flange 213a, 213b toward the other flange 213a, 213b. A pair of guiding pins 211a, 211b extends outwardly from two neighboring ears 214a, 214b of each coil seat 21a, 21b. Four grooves 216a, 216b are equidistantly defined in an inner surface of each cylinder 212a, 212b. Each groove 216a, 216b is located near a corresponding ear 214a, 214b. The lower coil seat 21b further defines four canals 217 in the inner surface for receiving the blocks 36 of the lens barrel 310 therein. The canals 217 and the lower grooves 216b are alternately arranged along a circumferential direction of the lower cylinder 212b of the lower coil seat 21b. A square-shaped base 215 is arranged under the lower coil seat 21b. A pair of connecting pins 211c are formed at two neighboring corners of the base 215 corresponding to the guiding pins 211a, 211b of the coil seats 21a, 21b.

The yokes 23a, 23b are made of material such as silicone steel, which can be easily magnetized when a magnetic field is applied thereto. Each yoke 23a, 23b is square-shaped and defines an octagon-shaped opening 230 therein. Four claws 234a, 234b extend perpendicularly from four spaced sides of an inner periphery of each yoke 23a, 23b. The claws 234a, 234b extend toward each other. Two notches 238 are respectively defined in two neighboring corners of an outer periphery of the lower yoke 23b. When assembled, the upper yoke 23a is arranged on the upper coil seat 21a with the upper claws 234a thereof received in the grooves 216a of the upper coil seat 21a, and the lower yoke 23b is arranged under the base 215 with the lower claws 234b thereof received in the grooves 216b of the lower coil seat 21b. The connecting pins 211c and the guiding pins 211a, 211b are located corresponding to the positions of the notches 238 of the lower yoke 23b. Each yoke 23a, 23b and the corresponding flange 213a, 213b cooperatively define a space therebetween for receiving a corresponding coil 25a, 25b therein, which winds around a corresponding cylinder 212a, 212b. The ends of each coil 25a, 25b wind on the guiding pins 211a, 211b of the corresponding coil seat 21a, 21b, and then are connected to the connecting pins 211c of the base 215. In this embodiment, the upper and lower coils 25a, 25b wind in opposite directions, and thus when electric currents are applied to the coils 25a, 25b, induced magnetic fields established by the two coils 25a, 25b have polarities opposite to each other.

When assembled, the lens unit 31 with the magnet 32 mounted therearound is movably received in the lens mount 10. The upper coil seat 21a with the upper yoke 23a and the upper coil 25a is arranged at the upper side of the magnet 32, and the lower coil seat 21b with the lower yoke 23b and the lower coil 25b is arranged at the lower side of the permanent magnet 32. The blocks 36 of the lens barrel 310 engage into the canals 217 of the lower coil seat 21b to prohibit rotation of the lens unit 31. Each upper ear 214a overlaps and abuts against a corresponding lower ear 214b. In this embodiment, the lower ears 214b are located inside of the upper ears 214a and are tangential to the lens barrel 310. Thus movement of the lens unit 31 is limited by the lower ears 214b, and swing of the lens unit 31 is avoided. The lens mount 10 surrounds the motor and the lens unit 31, and the connecting pins 211c are located in the cutouts 104 of the lens mount 10 and exposed to a surrounding environment for convenience of connecting a power source to the coils 25a, 25b. Thus, the camera is assembled. For the tabs 34 and blocks 36 formed on the lens barrel 310, the camera with the lens barrel 310 has a very simple structure and the magnet 32 can be assembled to the lens unit 31 easily and quickly. In accordance with the present invention, the magnet 32 is not necessary to be glued to the lens barrel 310. Thus assembling of the camera is time-efficient, and a cost for producing the camera is low.

During operation, electric currents are applied to the coils 25a, 25b. Each coil 25a, 25b establishes an induced magnetic field with polarities opposite to that of the other coil 25b, 25a. Thus an attractive force is generated between one yoke (such as the upper yoke 23a) and the magnet 32, whilst a repelling force is generated between the other yoke (the lower yoke 23b) and the magnet 32. The lens unit 31 with the magnet 32 thus moves from the lower yoke 23b by the repelling force therebetween to the upper yoke 23a by the attractive force therebetween. Conversely, when the currents applied to the coils 25a, 25b reverse, the polarities of the yokes 23a, 23b reverse. An attractive force is generated between the lower yoke 23b and the magnet 32, whilst a repelling force is generated between the upper yoke 23a and the magnet 32. The lens unit 31 with the magnet 32 thus moves from the upper yoke 23a to the lower yoke 23b. Thus the lens unit 31 can move between the two coil seats 21a, 21b. The position of the lens unit 31 at each coil seat 21a, 21b forms a focal point, and thus the lens unit 31 can switch between its focal points easily. As the magnet 32 is fixedly connected to the lens barrel 310, the magnet 32 cannot move relative to the lens unit 31. Thus a stable and precise movement of the lens 312 can be obtained.

Figure 4:
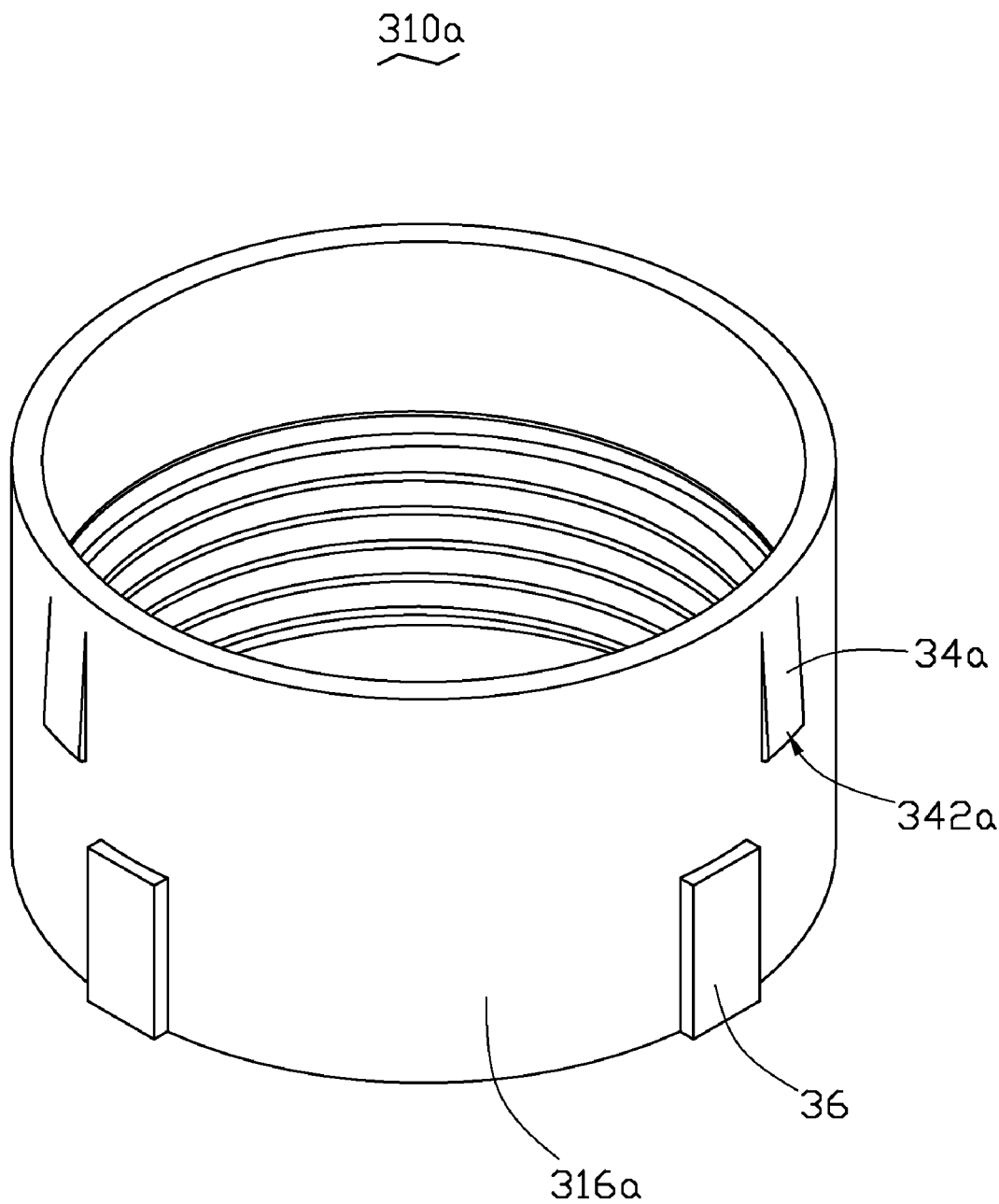
FIG. 4 is an isometric view of the lens barrel according to a second embodiment of the present invention.
Figure 5:
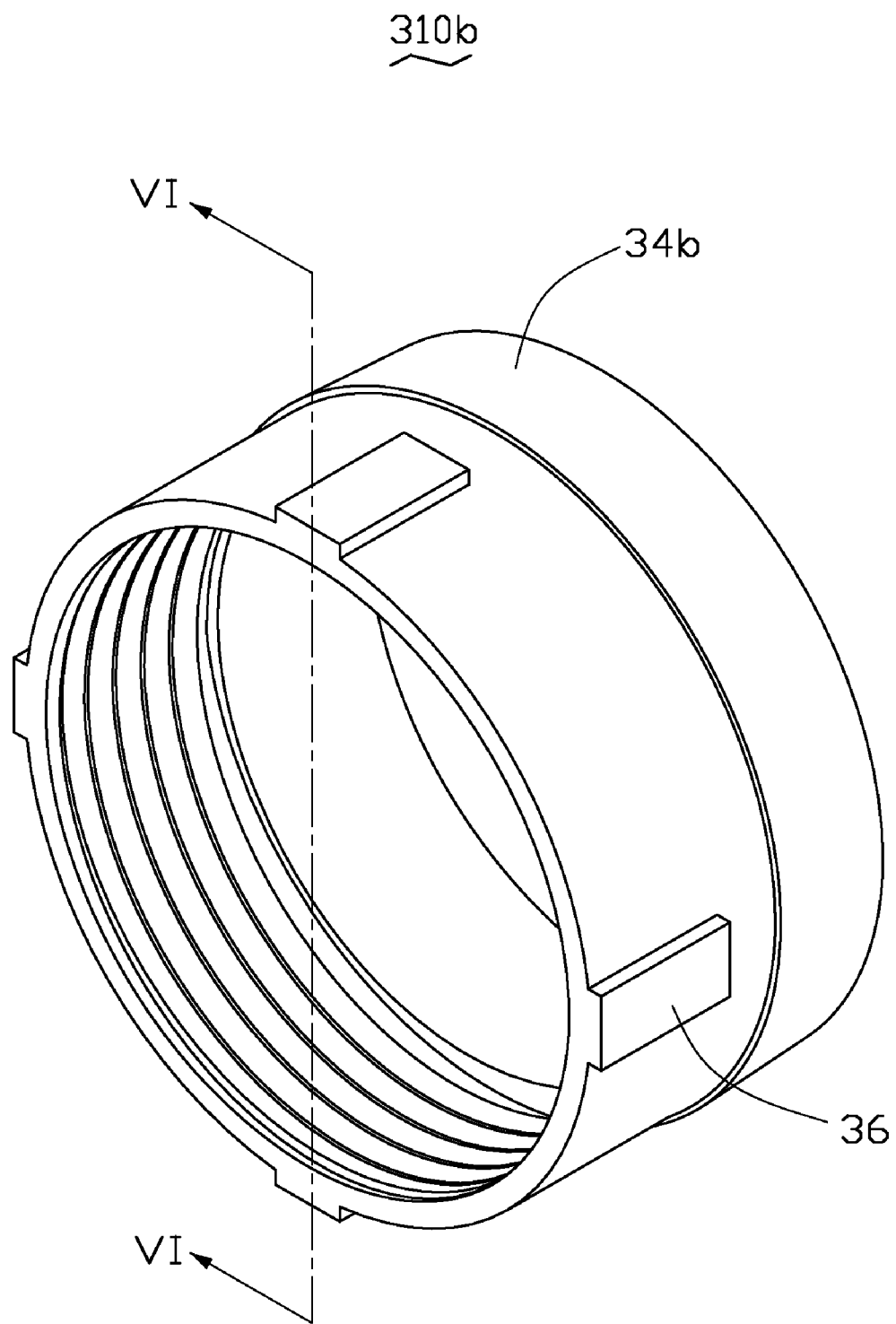
FIG. 5 shows an isometric view of the lens barrel according to a third embodiment of the present invention.
Figure 6:
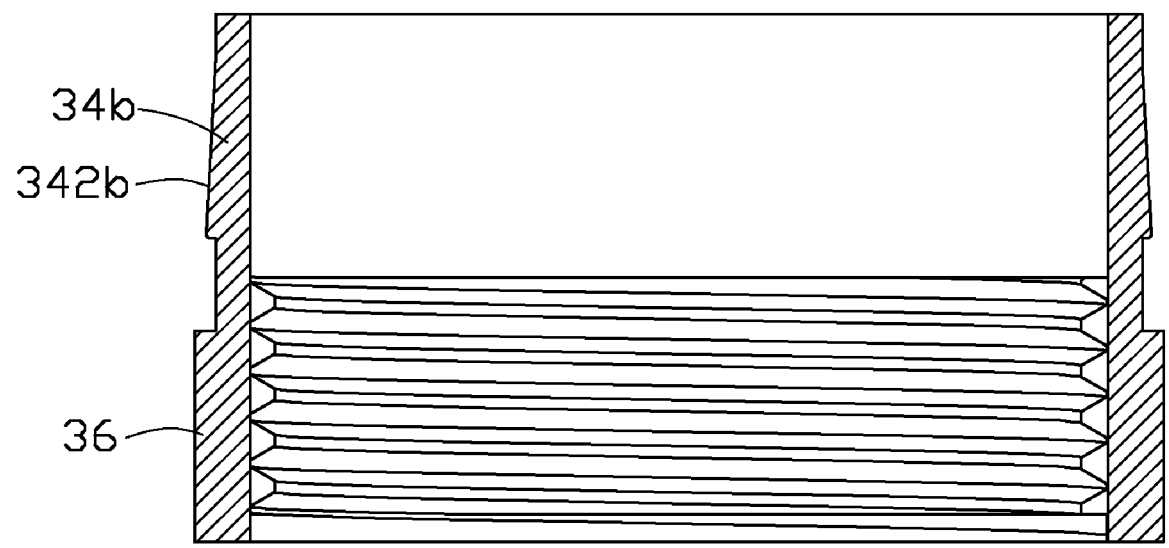

FIGS. 4-6 show alternative embodiments of the lens barrel 310a, 310b of the auto-focusing camera. As shown in FIG. 4, the lens barrel 310a according to a second embodiment has three tabs 34a and three blocks 36 formed at the upper and lower portions of the lens barrel 310a, respectively. The difference between the second embodiment and the first embodiment is that every side of the tabs 34a is connected to the outer surface 316a of the lens barrel 310a. When assembling the magnet 32 to the lens barrel 310a, a large downward pushing force is applied to the magnet 32 to force the magnet 32 to move over the guiding surface 342a of the lens barrel 310a until the magnet 32 is securely sandwiched between the tabs 34a and the blocks 36. FIGS. 5-6 show the lens barrel 310b according to a third embodiment of the present invention. The lens barrel 310b also has three blocks 36 extending outwardly from the lower portion thereof. The difference between the third embodiment and the second embodiment is that the tabs 34a of the second embodiment are replaced by a ring 34b of the third embodiment, wherein the ring 34b extends outwardly from a circumference of the upper portion of the lens barrel 310b. An outer surface 342b of the ring 34b is tapered, expanding outwardly gradually along a top-to-bottom direction.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. An auto-focusing camera comprising:
   a lens unit comprising a lens barrel and a lens received in the lens barrel, the lens barrel having at least one tab and at least one block respectively extending outwardly from two opposite ends thereof; and
   a motor for driving the lens unit into telescopic movement between its focal points during operation of the camera, the motor comprising a permanent magnet mounted around a middle of the lens barrel between the at least one tab and the at least one block to move with the lens unit, first and second yokes respectively arranged at opposite sides of the magnet, and first and second coils respectively winding around the first and second yokes, each coil establishing a magnetic field when an electric current is applied to the each coil, the magnetic fields of the first and second coils interacting with the magnetic field of the permanent magnet to drive the lens unit into movement;
   wherein a side of the at least one tab far from the magnet connects to the lens barrel, and other sides of the at least one tab are spaced from the lens barrel, whereby the at least one tab can rotate inwardly along a radial direction of the lens barrel when the magnet is assembled to the lens barrel.

2. The auto-focusing camera as claimed in claim 1, wherein the at least one tab has a thickness increasing along an axial direction of the lens barrel from the at least one tab towards the at least one block and thus forms an aslant and arc-shaped outer guiding surface, the magnet being forced to move from the end of the lens barrel forming the at least one tab to the middle of the barrel via the guiding surface.

3. The auto-focusing camera as claimed in claim 1, wherein each of two corners of the at least one tab near the magnet forms a chamfer angle.

4. The auto-focusing camera as claimed in claim 1, wherein the at least one tab comprises a plurality of tabs formed on the lens barrel and being evenly spaced from each other along a circumferential direction of the lens barrel.

5. The auto-focusing camera as claimed in claim 1, wherein the at least one block comprises a plurality of blocks formed on the lens barrel and being evenly spaced from each other along the circumferential direction of the lens barrel, each block being spaced from the at least one tab along the axial direction of the lens barrel.

6. The auto-focusing camera as claimed in claim 1, wherein a coil seat is arranged between each yoke and a corresponding coil, each coil seat having a cylinder and a flange extending outwardly from one end of the cylinder, a plurality of grooves being defined in an inner surface of each cylinder, each yoke having a plurality of claws being received in the grooves of a corresponding coil seat, each coil winding around the cylinder of the corresponding coil seat.

7. The auto-focusing camera as claimed in claim 6, wherein each flange forms two guiding pins for ends of the corresponding coil to wind thereon, and a base is arranged under the motor and forms two connecting pins for the ends of the coils to wind thereon.

8. The auto-focusing camera as claimed in claim 6, wherein at least one canal is defined in the inner surface of a corresponding cylinder for receiving the at least one block therein.

9. An auto-focusing camera, comprising:
   a lens mount;
   a lens unit received in the lens mount, the lens unit comprising a lens barrel and a lens received in the lens barrel, the lens barrel having at least one tab and at least one block respectively extending outwardly from two opposite ends thereof, the at least one tab forming an aslant guiding surface;
   a magnet being forced to move over the guiding surface to be mounted around the lens barrel, the at least one tab and the at least one block being located at opposite sides of the magnet to limit movement of the magnet along an axial direction thereof;
   two yokes being respectively arranged at the opposite sides of the magnet; and
   two coils respectively winding around the two yokes for establishing magnetic fields when electric currents are applied to the two coils, the magnetic fields interacting with magnetic field of the permanent magnet to drive the lens unit into movement;
   wherein a side of the at least one tab far from the magnet connects with the lens barrel, and other sides of the at least one tab are spaced from the lens barrel, thus the at least one tab can rotate inwardly relative to the lens barrel during assembly of the magnet to the lens barrel.

10. The auto-focusing camera as claimed in claim 9, wherein the guiding surface of the at least one tab is arc-shaped.

11. The auto-focusing camera as claimed in claim 9, wherein the at least one block comprises a plurality of blocks formed on the lens barrel and being evenly spaced from each other along a circumferential direction of the lens barrel, and the at least one tab comprises a plurality of tabs formed on the lens barrel and being evenly spaced from each other along the circumferential direction of the lens barrel, each block being spaced from the tabs along the axial direction of the lens barrel.

* * * * *